Oct. 19, 1943.  C. P. GALANOT  2,332,313
TRACK FOR TRACK-LAYING VEHICLES
Filed Sept. 3, 1942  2 Sheets-Sheet 1
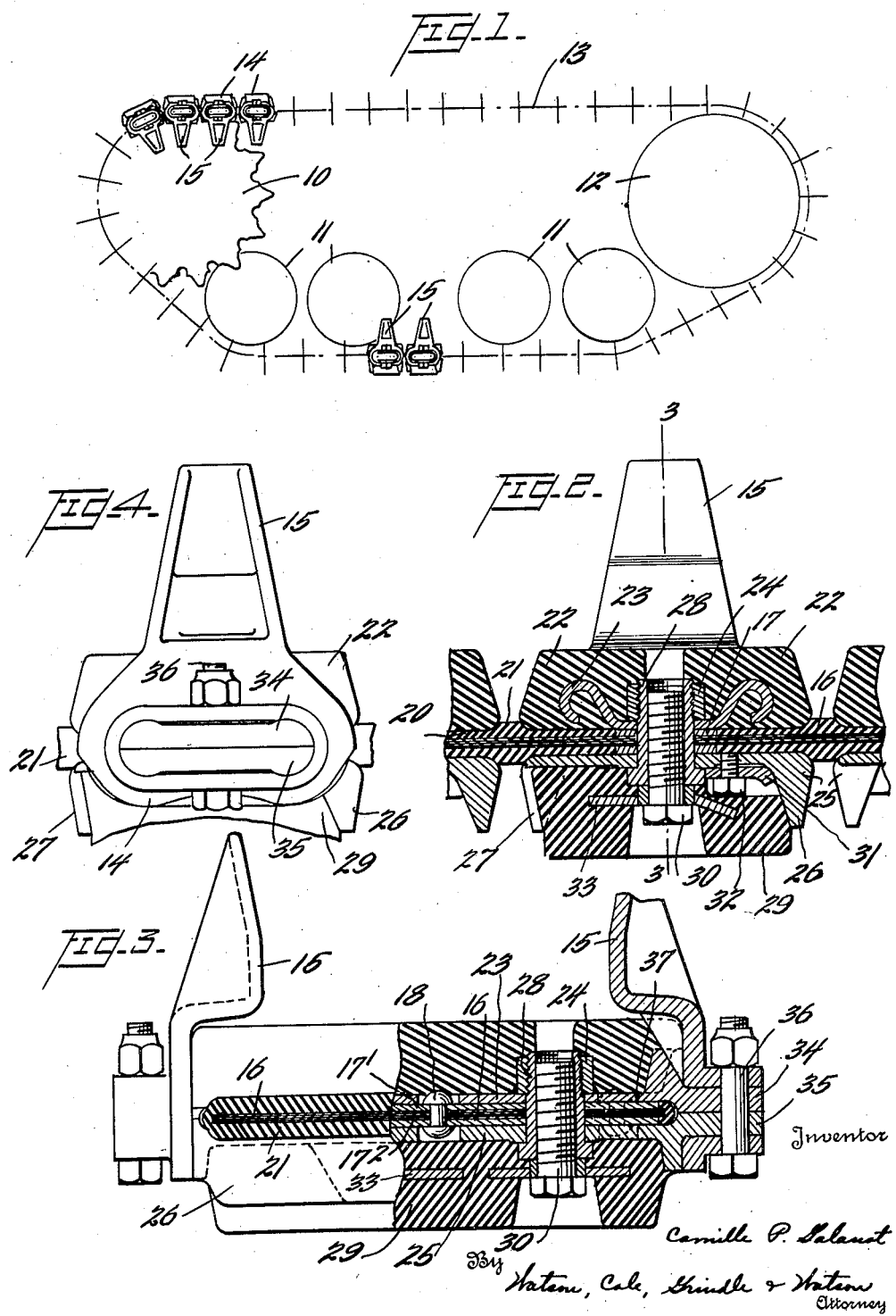

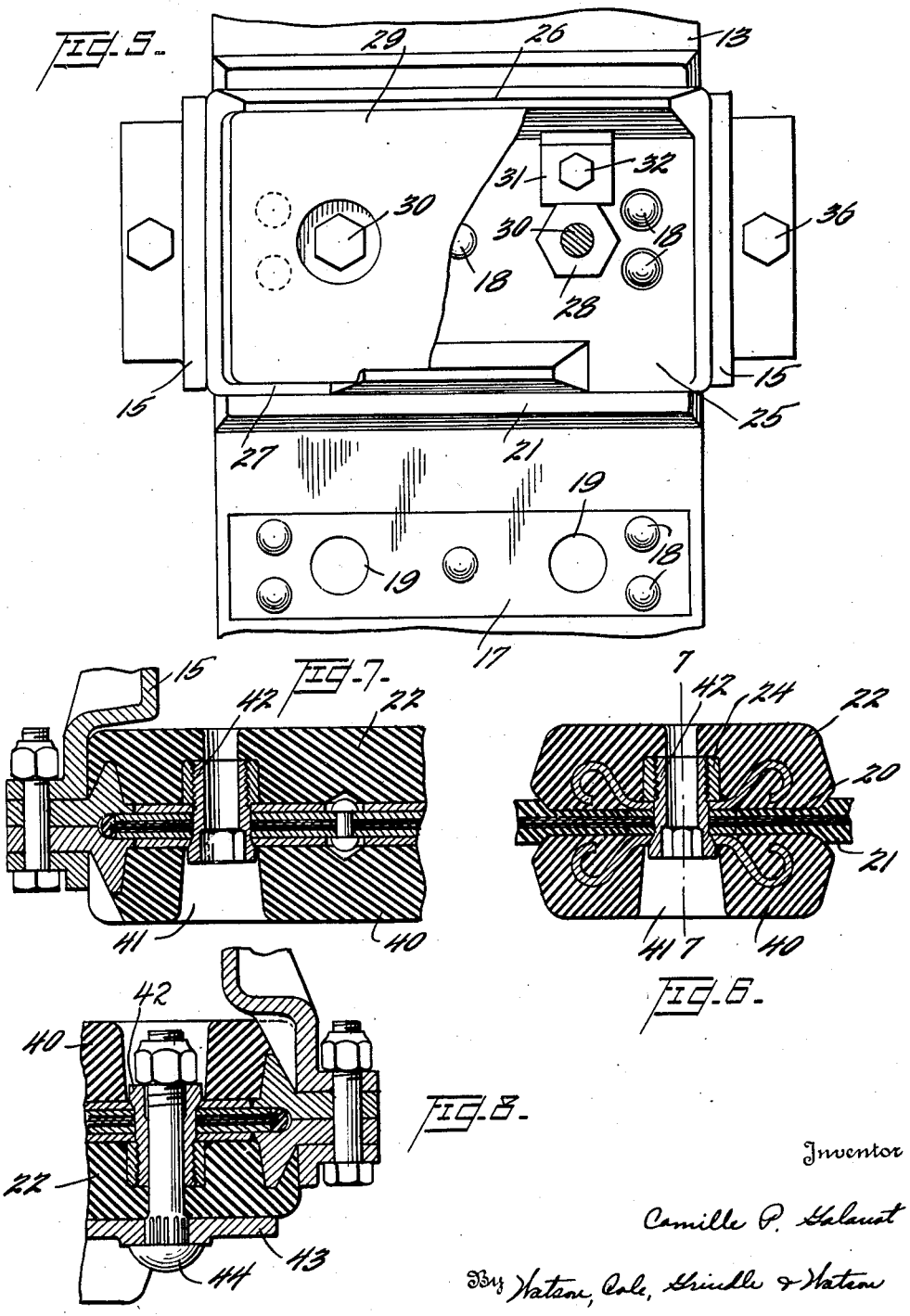

Patented Oct. 19, 1943

2,332,313

UNITED STATES PATENT OFFICE 2,332,313

TRACK FOR TRACK-LAYING VEHICLES

Camille P. Galanot, Alliance, Ohio, assignor of one-half to James A. Watson, Jr., Silver Spring, Md.

Application September 3, 1942, Serial No. 457,206

5 Claims. (Cl. 305—10)

This invention relates to tracks adapted for use with vehicles of the track-laying or crawler type, such as tractors for agricultural and industrial uses, and military vehicles such as tanks. The general object of the invention is the provision of a novel track having improved strength characteristics over those now in use, and having increased resistance to displacement relative to the track-guiding elements of the vehicle. Another object is the provision of a track comprising a belt and a plurality of detachable traction shoes, said shoes being provided with rubber facings on their inner sides, which engage the idler wheels of the vehicle, and with interchangeable rubber and steel members constituting the outer or ground engaging surfaces of the shoes.

According to one form of the invention, each traction shoe, which comprises an inner and an outer portion secured on opposite sides of the endless track belt, consists of a rubber block on the inner side of the belt and a steel grouser plate on the outer side. In this form, the invention further contemplates the use of rubber inserts adapted to be secured between the downwardly projecting flanges or grousers of the grouser plate and providing a resilient ground-engaging surface for the track when the vehicle is passing over roadways or other hard surfaces. In another form, the invention provides traction shoes comprising inner and outer portions of reinforced resilient material, such as rubber, with provision for securing a steel grouser plate on the ground-engaging side of each outer portion when necessary for adequate traction in sand, mud, or other yielding media.

As regards the belt, it is an object of the invention to provide an endless belt having a main tension element consisting of a plurality of thin, relatively wide layers of stainless steel, or other steel having high tensile strength, whereby the belt is substantially unstretchable, is quite flexible yet has great strength in tension, and a considerable resistance to lateral distortion which might cause it to deviate from its guideway on the vehicle. Preferably the tension element is made up of a plurality of convolutions of a continuous thin strip of steel, which increases the tensile strength of the tension member as compared with one made of a plurality of separate strips secured together.

The track device of the present invention is particularly useful in connection with tanks and similar military vehicles of the crawler type. The track now in common use for such vehicles comprises a series of individual shoes having laterally projecting pivot pins, the several shoes being connected by members embracing the adjacent pins of contiguous shoes and having pivotal movement relative thereto, said connecting members serving also as guide members and as sprocket teeth for engagement with the driving sprockets of the vehicle. This arrangement is not only extremely noisy, but being made up entirely of rigid elements which have relative motion under considerable bearing stresses, involves rapid wear, particularly in view of the conditions of use, necessitating frequent replacement of parts. Also, since a track of this type is essentially a chain, rather than a belt, the entire track may be put out of action by the failure, partial or entire, of a single traction shoe or connector.

Track belts comprised of a plurality of cables encased in rubber are also in use for certain types of track-laying vehicles, and serve to overcome certain of the aforesaid disadvantages of the pivot-connected type track, but such belts have not been adopted for heavier types of vehicles, such as medium and heavy tanks, probably due to the fact that they cannot be made sufficiently strong and, at the same time, sufficiently flexible. Flexure of a large-diameter cable about a relatively short radius involves considerable friction and, what is more important, involves stretching of the outer strands, i. e., those farthest from the center of flexure, with possible deformation of the inner strands. Furthermore, the use of large-diameter cables necessarily results in a belt having a relatively great thickness, including the rubber webs between the cables, thus further decreasing flexibility and increasing friction.

The disadvantages of the last-mentioned type of track belt are overcome, according to the present invention, by making the main tension member of the belt in the form of a relatively wide and thin ribbon comprised of a plurality of convolutions of thin steel strip of high tensile strength, preferably stainless steel. In this way the requisite tensile strength is provided, with minimum thickness, and great flexibility may be obtained with a minimum of friction. Preferably, the tension member is fabricated on a drum, whereby the outer layers of steel are slightly longer than the inner layers, and the strip is maintained under considerable tension during the winding, whereby stretching of the outer layers during use is substantially eliminated, and friction between the several layers during flexure is reduced to a minimum.

Other and further objects, features and advantages of the present invention will be apparent to one skilled in the art from the following description taken in connection with the accompanying drawings in which:

Figure 1 is a diagrammatic side elevation of a tank equipped with tracks made according to the present invention;

Figure 2 is a longitudinal vertical section through a section of track;

Figure 3 is a transverse vertical section on line 3—3 of Figure 2;

Figure 4 is an end elevation of a traction shoe and associated guide and sprocket element;

Figure 5 is a bottom plan view of a portion of track, certain parts being broken away;

Figure 6 is a longitudinal vertical section through a traction shoe according to one form of the invention;

Figure 7 is a fragmentary transverse section on line 7—7 of Figure 6; and

Figure 8 is a fragmentary vertical section showing the shoe of Figures 6 and 7 with a steel grouser plate attached thereto.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figure 1, the numeral 10 designates one of the driving sprockets of a tractor or tank, which is also provided with the usual idlers or bearing wheels 11, on which the weight of the vehicle is supported, and the idler sprocket 12, which latter assists in supporting and guiding the track, as well as maintaining, through spring means not shown, the requisite operating tension in the track, while permitting considerable deflection thereof when an obstacle or uneven surface is encountered.

The track comprises generally a belt 13 provided with closely spaced traction shoes 14, each of which carries, at each lateral extremity, a guide sprocket element 15 for engaging the sprocket wheels 10. In the usual case, a spaced pair of sprocket wheels is provided for driving each track, the respective wheels of said pair being adapted to engage the guide and sprocket elements carried at the opposite sides of the track. The elements 15 also serve to guide the track relative to the idler wheels 11 and idler sprocket 12.

Referring to Figures 2 and 3 it will be seen that the belt 13 comprises a tension member 16 consisting of a plurality, for example from six to twelve or more, of thin strips or layers of steel. The steel should be of good quality, having a high tensile strength, and it has been found that so-called "stainless" steel is suitable for the purpose. The several layers are quite thin, for example .010" in thickness, and are of a suitable width depending on the desired overall width of the track, for example from 8" to 12" or more.

The tension member 16 is provided with rivet holes, preferably while still on the winding drum, and the cross members 17 are riveted thereon at spaced intervals, each cross member preferably comprising inner and outer plates 17', 17² positioned no opposite faces of the tension member as seen, for example, in Figure 3. Five rivets 18 (Fig. 5) may be employed for securing the cross members to the tension member, and apertures 19 are provided through the cross members and tension member for securing the traction shoes thereto. Preferably, at this stage of the manufacture, the belt is provided with a rubber coating 20 except for the outer faces of the cross members and the walls of the apertures 19. Thickened portions 21 may be formed in the rubber coating 20 to assist in positioning the traction shoes, to transmit a portion of the tension stresses, and to assist in preventing the entry of foreign matter between the shoes and the belt.

Figures 2–5 illustrates the preferred form of traction shoe, comprising a block 22 of rubber, reinforced by a metal insert 23, which latter carries internally threaded bosses 24, and a steel shoe or grouser plate 25 having downwardly extending transverse flanges 26 and 27, the block 22 being positioned upon the inner face of the belt 13 and the plate 25 upon the outer face thereof. Hollow bolts 28 extend through the plate 25 and belt 13, and have threaded engagement with the bosses 24 for securing the plate 25 and block 22 to the belt. The bolts 28 are internally threaded in order that, for operation on hard surfaces, rubber inserts 29 may be secured between the flanges 26, 27 of the plates 25 by means of bolts 30, which engage the internal threads of the bolts 28. Preferably, the bolts 28 are locked by means of metal clips 31, retained by studs 32 (Fig. 2). The rubber inserts 29 are reinforced by metal plates 33.

In order to provide for mounting the guide and sprocket elements 15, the inner block 22 and plate 25 are each provided with flanged lateral extensions 34, 35 (Fig. 3), to which the guide and sprocket elements are secured by bolt 36, the guide and sprocket element encircling the extensions 34 and 35 and thus serving to assist in clamping the blocks 22 and plates 25 to the belt. Preferably, for convenience in manufacturing, the extensions 34 are separately formed and then welded to the respective ends of the metal inserts 23 of the blocks 22, as at 37 (Fig. 3). The extensions 35 may be integral with the plates 25.

Instead of the arrangement illustrated in Figures 2–5, the traction shoe may be constituted as seen in Figures 6 and 7, wherein the outer or ground-engaging block is substantially identical with the inner block 22, except that it does not have the bosses 24, but is provided with recesses 41 for the reception of the heads of the hollow bolts 42.

If desired the block 22 may be applied to the outer side of the belt, and the block 40 to the inner side, as seen in Figure 8. In this case, when desired, for operation in mud or other soft media, a grouser plate 43 may be secured on the ground-engaging side of the outer block by bolts 44 extending through the hollow bolts 42.

Having thus described the invention, what is claimed as new and desired to be secured by Letters Patent is:

1. In a track adapted for use with vehicles of the crawler type having drive sprockets and idler wheels, a continuous tension member comprising a plurality of thin layers of steel of high tensile strength, cross members secured to said tension member at spaced interals, and traction shoes secured to said cross members, said traction shoes comprising inner and outer portions detachably connected by means extending through said cross members.

2. In a track adapted for use with vehicles of the crawler type having drive sprockets and idler wheels, a continuous tension member comprising a plurality of thin layers of steel of high tensile strength, cross members secured to said tension member at spaced intervals, and traction shoes secured to said cross members, said traction shoes comprising inner and outer portions detachably connected by means extending through said cross members, said inner and outer traction shoe portions comprising metal-reinforced blocks of resilient material.

3. In a track adapted for use with vehicles of the crawler type having drive sprockets and idler wheels, a continuous tension member comprising a plurality of thin layers of steel of high tensile strength, cross members secured to said tension member at spaced intervals, and traction shoes secured to said cross members, said traction shoes comprising inner and outer portions detachably connected by means extending through said cross members, said inner portion comprising a metal-reinforced block of resilient material and said outer portion comprising a metal grouser plate.

4. In a track adapted for use with vehicles of the crawler type having drive sprockets and idler wheels, a continuous tension member comprising a plurality of thin layers of steel of high tensile strength, cross members secured to said tension member at spaced intervals, and traction shoes secured to said cross members, said traction shoes comprising inner and outer portions detachably connected by means extending through said cross members, said inner portion comprising a metal-reinforced block of resilient material and said outer portion comprising a metal grouser plate, and a detachable insert of reinforced resilient material.

5. In a track adapted for use with vehicles of the crawler type having drive sprockets and idler wheels, a continuous tension member comprising a plurality of thin layers of steel of high tensile strength, cross members secured to said tension member at spaced intervals, and traction shoes secured to said cross members, said traction shoes comprising inner and outer blocks of reinforced resilient material, and a metal grouser plate detachably secured outwardly of said outer block.

CAMILLE P. GALANOT.